United States Patent [19]

Fuchs

[11] Patent Number: 5,624,198
[45] Date of Patent: Apr. 29, 1997

[54] SWIVEL CONNECTOR

[75] Inventor: Patrick Fuchs, Garfield, N.J.

[73] Assignee: Zumtobel Staff Lighting, Inc., Garfield, N.J.

[21] Appl. No.: 596,019

[22] Filed: Feb. 6, 1996

[51] Int. Cl.$^6$ .................................................. F16D 1/12
[52] U.S. Cl. .................... 403/76; 403/122; 403/143; 403/127; 248/288.31; 248/278.1; 285/266; 362/421; 362/429
[58] Field of Search ................... 403/76–77, 78, 403/66, 57, 114, 115, 122, 143, 135, 127; 248/288.31, 278.1; 285/261, 263, 266, 271, 907; 362/287, 421, 429

[56] References Cited

U.S. PATENT DOCUMENTS

| 586,176 | 7/1897 | Gorter | 285/263 |
| 4,088,348 | 5/1978 | Shemtov | 285/263 |
| 5,090,654 | 2/1992 | Ridings et al. | 403/76 |

*Primary Examiner*—Kenneth J. Dorner
*Assistant Examiner*—William L. Miller
*Attorney, Agent, or Firm*—Anderson Kill & Olick P.C.

[57] ABSTRACT

A swivel connector for supporting a fixture and including a swivel socket, a spherically shaped hollow member located in the socket and forming with the socket a first universal joint, and two adaptors for connecting the swivel connector to a support and the fixture, respectively, with the support-connecting adapter being connected to the swivel socket and with the fixture-connecting adaptor having a spherical portion received within the hollow swivel member and forming with the swivel member a second universal joint.

5 Claims, 1 Drawing Sheet

5,624,198

SWIVEL CONNECTOR

BACKGROUND OF THE INVENTION

The present invention relates to a swivel connector for connecting, e.g., two rod-like members with each other, with a possibility of pivoting one rod-like member relative to another rod-like member in different planes. Such a swivel connector can be used, e.g., for attaching a lighting fixture or the like to a wall or a ceiling. The swivel connector permits to adjust the position of the lighting fixture so that the light would fall on a desired spot.

Such a swivel connector is well known and is widely used. A known swivel connector for supporting lighting assemblies, so called luminaires, includes a disc-shaped canopy having a central opening for receiving a swivel ball carrying a rod for supporting a luminaire, and a canopy support strap for attaching the ball receiving canopy to an appropriate support, e.g., a ceiling. The support strap may be formed as a bracket attachable to the ceiling. This connector permits to swing the rod-supported luminaire up to 45° from a vertical.

The drawbacks of the above-described swivel connector consist in that it requires additional elements for attaching the canopy to the bracket, and that the attachment of the bracket to the ceiling is a relatively time-consuming operation.

Yet another drawback consists in that the wire may become twisted when the swivel ball is swung from the vertical.

Accordingly, an object of the invention is a swivel connector formed of few parts, easily assemblable with one another.

A further object of the invention is a swivel connector easily attachable to a support element and to a fixture supporting member.

A still further object of the invention is preventing the wires from twisting upon swinging the rod from the vertical.

SUMMARY OF THE INVENTION

These and other objects of the invention, which become apparent hereinafter, are achieved by providing a swivel connector which includes a swivel socket, a spherically shaped hollow member located in the socket and forming with the socket a first universal joint, and two adaptors for connecting the swivel connector to a support and the fixture respectively, with one of the adapters being connected to the swivel socket and with the other of the adapters having a spherical portion received within the hollow swivel member and forming with the swivel member a second universal joint. The spherical portion is slidably received within the hollow swivel member, which insures a 360° degree rotation of the other adapter about its axis relative to the hollow swivel member. Preferably, the one adapter, which is releasably connected with the swivel socket, connects the swivel connector to the support, and the other of the adapters connects the swivel connector to the fixture.

According to the invention, the swivel member is formed as a ball segment, and the swivel socket has a first end having a complementary arcuate inner surface cooperating with the ball segment, and a second end connectable with the first adapter. The second end of the swivel socket has an inner thread, and the first adapter has an end portion having an outer thread cooperating with the inner thread of the second end of the swivel socket for connecting the first adapter with the swivel socket. The first adapter has preferably a threaded central opening in which a threaded portion of a rod, which connects the swivel connector to the support, is received. The support may, e.g., be a rod which is secured in a ceiling and has a threaded free end.

According to the invention, an end surface of the first adapter located inside the swivel socket acts a stop limiting pivotal movement of the swivel member. At least, the first end of the swivel socket, which defines an arcuate inner end surface portion, has an apex acting as a stop limiting pivotal movement of the second adapter relative to the swivel member.

According to the invention, the spherically shaped portion of the other adapter is formed as a hollow spherical segment, and the remaining portion of the second adapter is a hollow cylindrical part connected to the hollow spherical segment by a reduced diameter portion. The hollow cylindrical part has an outer thread adapted to be received in a threaded tubular rod.

The swivel connector according to the invention can be easily assembled and connected to a respective support and a fixture. To assemble the connector, the swivel member is placed in the socket, the adapter with a spherically shaped portion is inserted through the socket and the hollow swivel member, and the first adapter is screwed into the socket. Then the connector is screwed onto a threaded support and is ready to be connected to a fixture.

Further, the rotation of the spherically shaped portion about its axis relative to the swivel member by 360° permits to avoid twisting of wires during the adjustment of the fixture.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
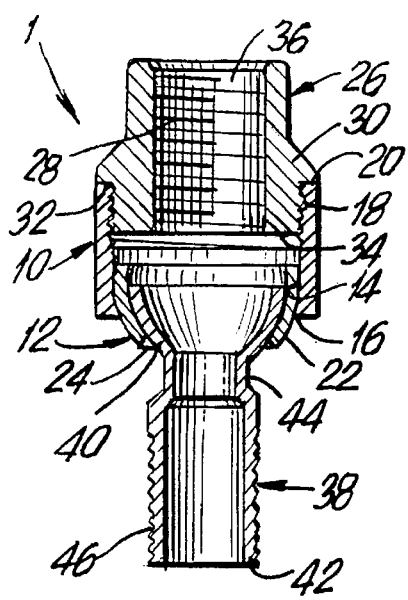
FIG. 1 shows a cross-sectional view of a swivel connector according to the present invention.

FIG. 1 shows a swivel connector 1 according to the present invention for attaching a fixture to a support. The swivel connector 1 can be used, e.g., for attaching an illuminating or lighting fixture such as a luminaire to a ceiling.

The swivel connector 1 includes a swivel socket 10 and a spherically shaped swivel member 12, which is formed as a segment of a hollow ball received within the swivel socket 10. The swivel socket 10 has an arcuate inner surface portion 14 within which the swivel member 12 is received. The swivel socket 10 and the swivel member 12 form together a first universal joint. The arcuate inner surface portion 14 ends at an apex 16. At its end opposite to the arcuate inner surface, the socket 10 has a threaded portion 18 which ends at an end surface 20 of the swivel socket 10. The swivel member 12 has an outer surface 22 which is complementary to the arcuate inner surface portion 14 of the swivel socket 10. As it already has been discussed above, the swivel member 12 is formed as a segment of a hollow ball having an opening 24 in the segment wall.

Figure 2:
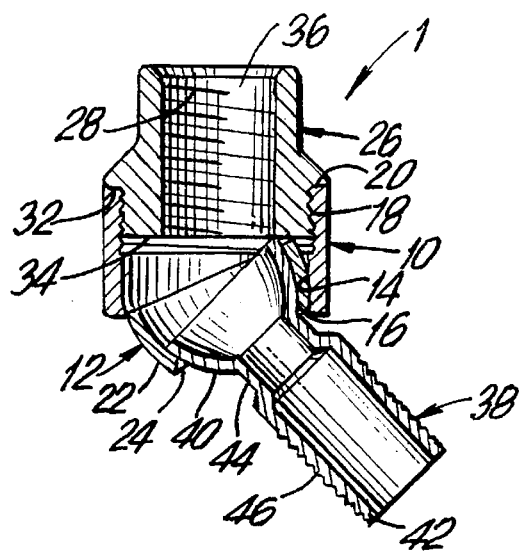
FIG. 2 shows a cross-sectional view of a swivel connector according to the present invention in a pivotal position.
Figure 3:
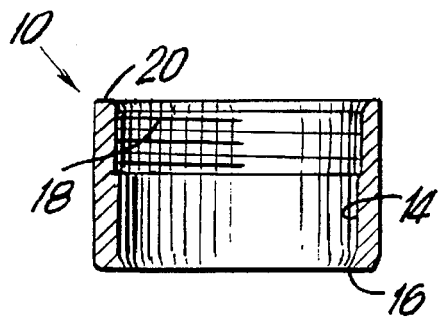
FIG. 3 shows a cross-sectional view of the swivel socket of a swivel connector according to the present invention.
Figure 4:
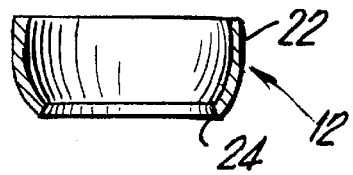
FIG. 4 shows a cross-sectional view of the swivel member of a swivel connector according to the present invention.
Figure 5:
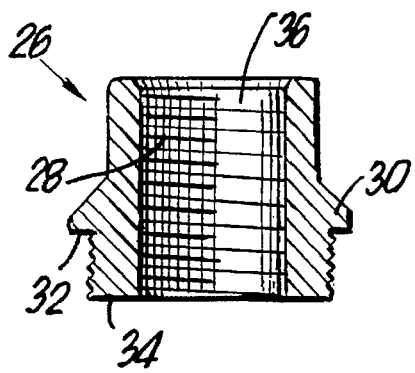
FIG. 5 shows an adapter of the swivel connector according to the present invention to securing the swivel connector to a support.
Figure 6:
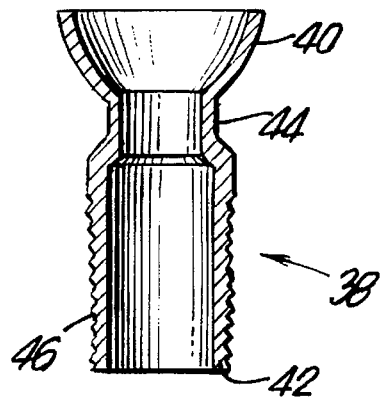
FIG. 6 shows an adapter of the swivel connector according to the present invention for connecting the swivel connector to a fixture.

The swivel socket 10 is connected with an adapter 26 which can connect the socket 12, and thereby the entire connector 1, to a support or a fixture. However, usually the adapter 26 provides for mounting the swivel connector 1 on a support. The adapter 26 has a threaded portion 28 which cooperates with the threaded portion 18 of the socket 10 for connecting the adapter 26 with the socket 10. The adapter 26 has a flange portion 30 having a shoulder 32 which usually engages the end surface 20 of the socket when the adapter 26 is secured to the socket 10. The end surface 34 of the adapter 26 acts as a stop, as can be seen in FIG. 2, which limits pivotal movement of the swivel member 12. The adapter 26 further has a central threaded through-bore 36 for receiving a threaded rod connecting the swivel connector to a support, usually a ceiling or a wall.

The adapter 38 is usually used for connecting the swivel connector 1 to a fixture. The adapter 38 usually is formed as a hollow member and has a spherical end portion 40, which is also formed as a segment of a ball and which is received within the swivel member 12, forming with the swivel member 12 a second universal joint. The outer surface of the spherical portion 40 of the adapter 38 is complementary to the inner surface of the swivel member 12. The adapter 38 further has a cylindrical portion 42 which is connected with the spherical portion 40 by a reduced diameter portion 44, provided to enable pivotal movement of the adapter 38. The pivotal movement of the adapter 38 is limited, as can be seen in FIG. 2, by the apex 16 of the socket 10 which is engaged by the portion 44. The adapter 38 has an outer thread portion 46 for attaching to a tubular threaded member which connects the swivel connector 1 with a fixture, of course, the adapter 38 can be provided with an inner thread instead of an outer thread to be connecting to a corresponding connecting rod, which would connect the swivel connector with a fixture.

To assemble the connector 1, the swivel member 12 is placed in the socket 10 and then the adapter 38 is inserted into the swivel member 12. Thereafter, the adapter 26 is screwed into the socket 10, and the swivel connector 1 is ready to be used. As it can be seen from the foregoing description, the present invention provides a swivel connector which consists only of a few parts, which can be easily assembled and connected with respective connecting members, which would connect the swivel connector to an appropriate support, e.g., a hook secured in a ceiling, and a fixture. Obviously, any end can be connected with either the support or fixture.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A swivel connector for supporting a fixture, comprising:

a swivel socket;

a spherically shaped hollow swivel member received in the swivel socket and defining therewith a first universal joint;

a first adapter connectable with the swivel socket for connecting the swivel connector to one of a support and the fixture; and a second adapter for connecting the swivel connector to another of the support and the fixture, the second adapter having a first spherically shaped portion received within the swivel member and defining therewith a second universal joint.

wherein the swivel member is formed as a ball segment, and the swivel socket has a first end having a complementary arcuate inner surface cooperating with the ball segment, and a second end connectable with the first adapter, and wherein the first end of the swivel socket has an apex forming an integral part thereof and acting as a stop limiting pivotal movement of the second adapter relative to the swivel member by direct contact with the second adapter.

2. A swivel connector for supporting a fixture, comprising:

a swivel socket;

a spherically shaped hollow swivel member received in the swivel socket and defining therewith a first universal joint;

a first adapter connectable with the swivel socket for connecting the swivel connector to one of a support and the fixture; and a second adapter for connecting the swivel connector to another of the support and the fixture, the second adapter having a first spherically shaped portion received within the swivel member and defining therewith a second universal joint, wherein the swivel member is formed as a ball segment, and the swivel socket has a first end having a complementary arcuate inner surface cooperating with the ball segment, and a second end connectable with the first adapter, wherein the second end of the swivel socket has an inner thread, and the first adapter has an end portion having an outer thread cooperating with the inner thread of the second end of the swivel socket for connecting the first adapter with the swivel socket, and wherein the first adapter has a central threaded opening for cooperating with a threaded rod connecting the swivel connector with the one of the support and the fixture.

3. A swivel connector for supporting a fixture, comprising:

a swivel socket;

a spherically shaped hollow swivel member received in the swivel socket and defining therewith a first universal joint;

a first adapter connectable with the swivel socket for connecting the swivel connector to one of a support and the fixture; and a second adapter for connecting the swivel connector to another of the support and the fixture, the second adapter having a first spherically shaped portion received within the swivel member and defining therewith a second universal joint, wherein the swivel member is formed as a ball segment, and the swivel socket has a first end having a complementary arcuate inner surface cooperating with the ball segment, and a second end connectable with the first adapter, wherein the second end of the swivel socket has an inner thread, and the first adapter has an end portion having an outer thread cooperating with the inner thread of the second end of the swivel socket for connecting the first adapter with the swivel socket, wherein an end surface of the first adapter located inside the swivel socket acts as a stop limiting pivotal movement of the swivel member.

4. A swivel connector as set forth in claim 3, wherein the first spherically shaped portion of the second adapter is formed as a hollow spherical segment, and the second adapter has a second portion formed as a hollow cylindrical part connected to the hollow spherical segment by a reduced diameter portion.

5. A swivel connector as set forth in claim 4, wherein the cylindrical part has an outer thread cooperating with an inner thread of a tubular rod member connecting the swivel connecter with the another of the support and the fixture.

* * * * *